United States Patent [19]
Soshi et al.

[11] Patent Number: 5,349,402
[45] Date of Patent: Sep. 20, 1994

[54] DATA IMPRINTING DEVICE FOR A CAMERA

[75] Inventors: Isao Soshi; Hidenori Miyamoto; Motoyuki Ohtake; Hiroshi Wakabayashi, all of Tokyo, Japan

[73] Assignee: Nikon Corporation, Tokyo, Japan

[21] Appl. No.: 124,670

[22] Filed: Sep. 21, 1993

[30] Foreign Application Priority Data

| | | |
|---|---|---|
| Sep. 21, 1992 [JP] | Japan | 4-250295 |
| Dec. 30, 1992 [JP] | Japan | 4-093489[U] |
| Jan. 22, 1993 [JP] | Japan | 5-009202 |
| Jan. 27, 1993 [JP] | Japan | 5-011876 |

[51] Int. Cl.$^5$ .................................................. G03B 17/24
[52] U.S. Cl. .................................................... 354/106
[58] Field of Search ........................ 354/105, 106, 109

[56] References Cited

U.S. PATENT DOCUMENTS

| | | | |
|---|---|---|---|
| 4,265,526 | 5/1981 | Ueda et al. | 354/106 |
| 4,994,830 | 2/1991 | Harvey | 354/106 |
| 5,057,857 | 10/1991 | Hata et al. | 354/106 |
| 5,128,702 | 7/1992 | Ogawa et al. | 354/106 |
| 5,245,373 | 9/1993 | Ogawa et al. | 354/106 |

Primary Examiner—David M. Gray
Attorney, Agent, or Firm—Lawrence I. Wechsler; Thomas R. Morrison; Peter Jon Gluck

[57] ABSTRACT

A data imprinting device for a camera has a light source, a diaphragm member, and an optical member mounted on support structures integrally formed in a body of the camera. Another embodiment of the invention includes first and second optical members for imprinting data at two respective locations, upon a film, corresponding to full size and panorama size modes of operation. A shutter slides to obstruct emergent light from one of the first and second optical member thus disabling it from imprinting. The first and second optical members are integrally formed in a bracket structure which is mounted in a body of the camera. Embodiments includes the first and second optical members having emergent planes equidistant from the film. The first and second optical elements have incident planes either offset in a direction parallel with the film or perpendicular to it. Similar exposure characteristic at the two respective locations are maintained by controlling numerical apertures and transmittances of the first and second optical members.

20 Claims, 19 Drawing Sheets

DATA IMPRINTING DEVICE FOR A CAMERA

BACKGROUND OF THE INVENTION

This invention relates to data imprinting devices, for cameras, which imprint data on pictures taken including the date when the picture is taken. More particularly, the invention relates to a data imprinting device having an integrated optical system which reduces the number of elements in the camera and thereby increases productivity.

Conventional imprinting devices include a compound prism lens element, mounted in a shaft of a camera body, and a diaphragm element mounted within the shaft a fixed distance from the prism lens element. A spacer support member is required to mount the diaphragm member a correct distance from the prism lens for a gathering a light beam and controlling properly controlling an amount of light passing therethrough. This installation of the spacer support member and the alignment of the respective parts increases production time and costs.

At times, it is desirable to imprint data on multiple types of screens or imprint multiple data on one screen. In conventional devices, imprinting data on the film at different locations requires multiple optical members. Each optical member has to be accurately placed in the camera so that the data is properly focused and clearly imprinted on the film for each screen mode. Generally, the installation process is very time consuming.

Imprinting data on different locations at the same time requires additional control mechanisms. These are needed to account for the differing amounts of light and flash time. This adds additional elements to the camera. More specifically, Japanese Laid Open Patent Application No. 58-79235 discloses a filter disposed between the light source and the optical members to adjust the amount of light to obtain proper exposure. In this case, the filter has to be supported by another element. The same drawbacks exist in this prior art.

Other conventional devices having a plurality of optical members, a control mechanism for each optical member is required. The control mechanism adjusts an amount of light from a light emitting source to obtain proper exposure when imprinting data. The control mechanism is an electrical control device which operates during each exposure. However, the control mechanism requires additional data and hardware elements to calculate a correction value than a normal camera does. Increases in the production cost of the camera result. Additionally, it is impossible to simultaneously imprint data at multiple positions using devices of the prior art.

OBJECT AND SUMMARY OF THE INVENTION

Accordingly, it is an object of this invention to provide a data imprinting device which eliminates the drawbacks of the prior art.

It is another object of this invention to provide a data imprinting device for a camera, which has an integrated optical system composed of a plurality of optical members.

It is still another object of this invention to provide a data imprinting device for a camera, which reduces the number of elements in the camera, resulting in reduced installation time.

It is still another object of this invention to provide a data imprinting device for a camera, which has an optical system where a support portion is formed integrally with a camera body so as to mount a diaphragm member.

It is still another object of this invention to provide a data imprinting device for a camera, which has an integrated optical system where multiple data may be imprinted on the film at different locations at the same time.

It is still another object of this invention to provide a data imprinting system for a camera, which has an integrated optical system where data may be imprinted at different locations for different types of screens.

It is still a further object of this invention to provide a data imprinting device for a camera, which has a plurality of optical members with pre-adjusted transmittances at appropriate exposures to imprint data, instead of additional elements such as an electrical control mechanism and a filter to adjust the amount of light from a light source, thereby reducing production cost of a camera.

Briefly stated, the present invention provides a data imprinting device for a camera having a light source, a diaphragm member, and an optical member mounted on support structures integrally formed in a body of the camera. Another embodiment of the invention includes first and second optical members for imprinting data at two respective locations, upon a film, corresponding to full size and panorama size modes of operation. A shutter slides to obstruct emergent light from one of the first and second optical member thus disabling it from imprinting. The first and second optical members are integrally formed in a bracket structure which is mounted in a body of the camera. Embodiments includes the first and second optical members having emergent planes equidistant from the film. The first and second optical elements have incident planes either offset in a direction parallel with the film or perpendicular to it. Similar exposure characteristic at the two respective locations are maintained by controlling numerical apertures and transmittances of the first and second optical members.

According to an embodiment of the present invention, a data imprinting device for a camera is provided comprising: a diaphragm member, an optical member, the camera having a camera body, a light source for imprinting data on a film, the diaphragm member gathering light from the light source, the optical member reflecting and focusing the light upon the film, means for supporting the diaphragm member, means for mounting the optical member, and the means for supporting and the means for mounting being formed integrally with the camera body.

According to still another embodiment of the present invention, a data imprinting device for a camera is provided comprising: means for selecting a chosen mode of a first and a second screen size mode, a light source mounted in a body of the camera, means for driving the light source responsive to a movement of a film, a first optical member for focusing light from the light source upon the film at a first location, when the first screen size mode is selected, whereby an image is imprinted upon the film at the first location, a second optical member for focusing light from the light source upon the film at a second location, when the second screen size mode is selected, whereby an image is imprinted upon the film at the second location, bracket means for coupling the first and second optical members in a fixed relationship to each other, and the bracket means being mounted in the body of the camera such that the first and second optical members focus the light source upon the film. Furthermore, the first and second optical members may optionally be formed integrally with the bracket means.

According to yet another embodiment of the present invention, a data imprinting device for a camera is provided comprising: means for selecting a chosen mode of a first and a second screen size mode, a light source mounted in a body of the camera, means for driving the light source responsive to a movement of a film, a first optical member for focusing light from the light source upon the film at a first location, when the first screen size mode is selected, whereby an image is imprinted upon the film at the first location, a second optical member for focusing light from the light source upon the film at a second location, when the second screen size mode is selected, whereby an image is imprinted upon the film at the second location, and the of optical members having equivalent numerical apertures at incident sides thereof.

A feature of the present invention, includes a data imprinting device for a camera, comprising: means for selecting a chosen mode of a first and a second screen size mode, a light source mounted in a body of the camera, means for driving the light source responsive to a movement of a film, a first optical member for focusing light from the light source upon the film at a first location, when the first screen size mode is selected, whereby an image is imprinted upon the film at the first location, a second optical member for focusing light from the light source upon the film at a second location, when the second screen size mode is selected, whereby an image is imprinted upon the film at the second location, and the first and second optical members each having a pre-adjusted transmittance such that images created by each have substantially identical exposure characteristics.

Yet another feature of the present invention provides a data imprinting device for a camera, comprising: means for selecting a chosen mode of a first and a second screen size mode, a light source mounted in a body of the camera, means for driving the light source responsive to a movement of a film, a first optical member for focusing light from the light source upon the film at a first location, when the first screen size mode is selected, whereby an image is imprinted upon the film at the first location, a second optical member for focusing light from the light source upon the film at a second location, when the second screen size mode is selected, whereby an image is imprinted upon the film at the second location, and the first and second optical members having numerical apertures, $NA_K$ and $NA_{K+1}$ respectively, and transmittances, $T_K$ and $T_{K+1}$ respectively, satisfying the expression, $(NA_K)^2 \cdot T_K = (NA_{K+1})^{2*} T_{K+1}$.

DETAILED DESCRIPTION OF THE PREFERRED EMBODIMENTS

Figure 20:
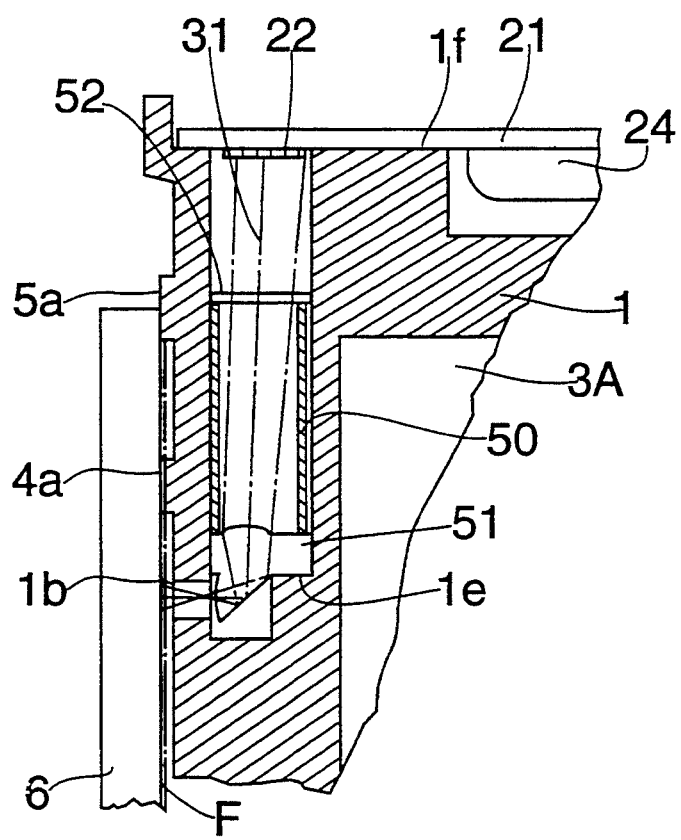
FIG. 20 is a cross sectional view of the prior art.

Referring to FIG. 20, a prior art device includes a cylindrical guiding member 50 on a prism 51. A diaphragm member 52 is mounted on the cylindrical guiding member 50 which functions as a spacer supporting the diaphragm member the correct distance from the prism 51. The installation and alignment of the three pieces results in an increased camera parts count and increased production time and costs.

Figure 1:
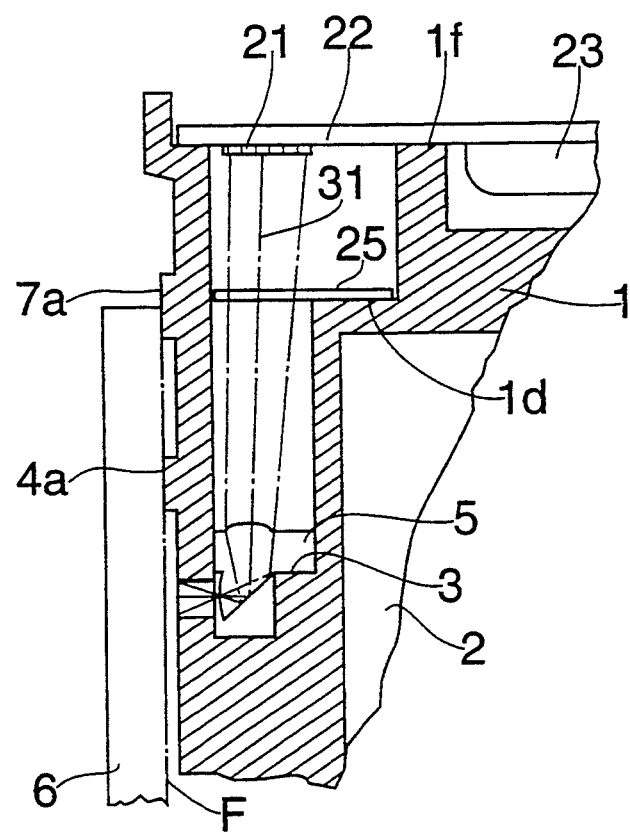
FIG. 1 is a cross sectional view of an embodiment of the data imprinting device according to the present invention.
Figure 2:
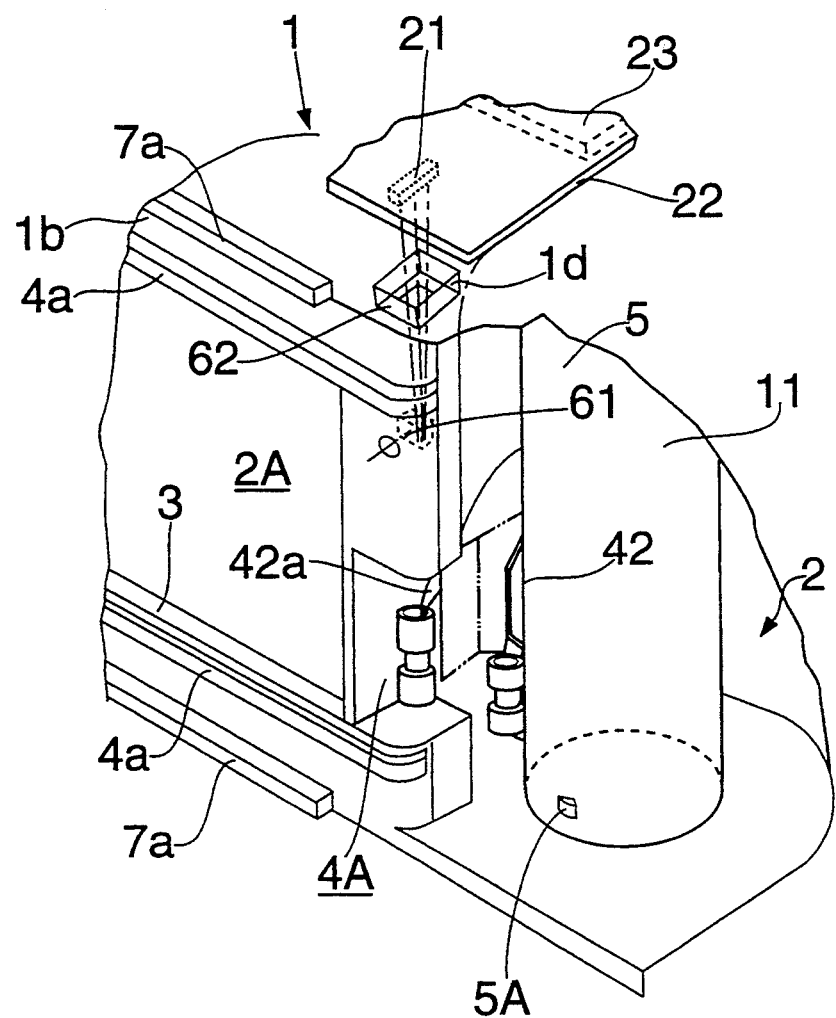
FIG. 2 is a partly perspective view of the data imprinting device shown in FIG. 1.
Figure 3:
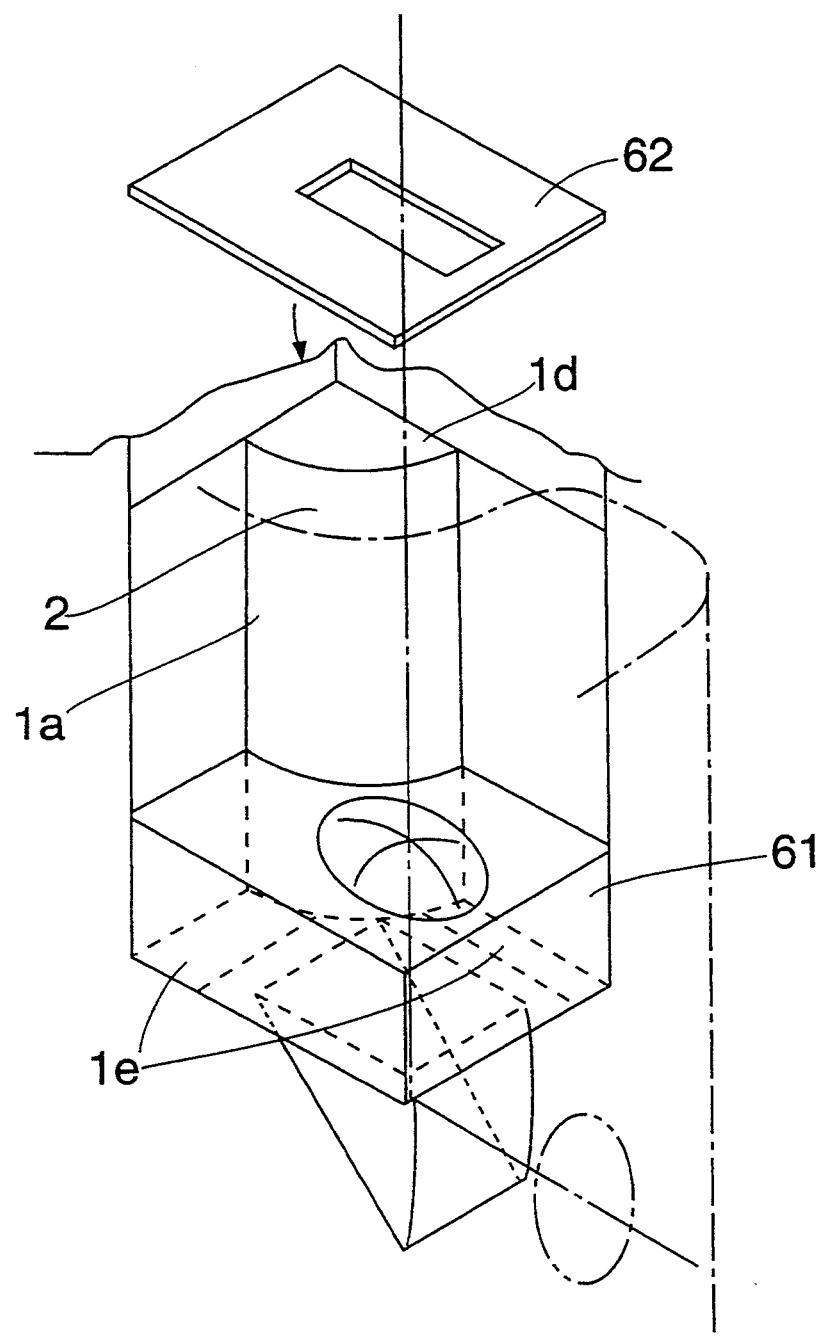
FIG. 3 is an exploded view of the data imprinting device shown in FIG. 1.

Referring to FIGS. 1 through 3, an embodiment of the invention reduces a parts count of a camera and includes the elimination of cylindrical guiding member 50 of the aforementioned prior art. A camera body 1 includes a dark chamber 2A and a spool chamber 2 separated by a separating wall 1a. Camera body 1 has a rectangular aperture 3 at a rear surface 1b. A pair of inner rails 4a and outer rails 7a extend beyond rear surface 1b. A pressing plate 6 makes contact with outer rails 7a. A film F passing between the inner rails 4a and pressing plate 6 is wound on spool 5 in spool chamber 2.

Referring to FIG. 2, a claw member 5a is disposed on cylindrical spool 5. Claw member 5a engages the perforations of film F when winding film F. A supporting roller 42 is affixed by a leaf spring 42a to separating wall 1a in spool chamber 2. Leaf spring 42a urges supporting roller 42 toward cylindrical spool 5. A sprocket perforation (not shown) in film F is engaged by claw member 5a. As cylindrical spool 5 is rotated in a counterclockwise direction, drawing film F into spool chamber 2 while supporting roller 42 is biased against film F ensuring that film F is being correctly wound onto cylindrical spool 5. As the film F is wound onto cylindrical spool 5, film F build-up pushes supporting roller 42 toward the location identified by the dotted line image.

Camera body 1 has an optical system for imprinting incorporated into the upper part of separating wall 1a to decrease number of camera elements and camera size. The lower part of separating wall 1a allows for the movement required by supporting roller 42. The optical system includes a light emitting element 21 as a light source, disposed on a base 22. Preferably, light emitting element 21 includes light emitting diodes (LEDs), which are disposed in a linear arrangement. Alternatively, other light sources such a backlit LCD displays and electroluminescent displays are optionally employable. A driving circuit 23 is disposed at an upper surface 1f of spool chamber 2.

Referring to FIG. 3, a first support portion 1d is preferably disposed at the upper part of spool chamber 2. It is located spool chamber 2 because spool chamber 2 has more space than in the upper part of separating wall 1a. A diaphragm member 62 is mounted on first support portion 1d following the mounting of a prism 61 on a second support portion 1e. The support portion 1d can also be implemented in a side of the spool chamber 2 or by cutting a recessed space in the upper part of separating wall 1a.

Figure 4:
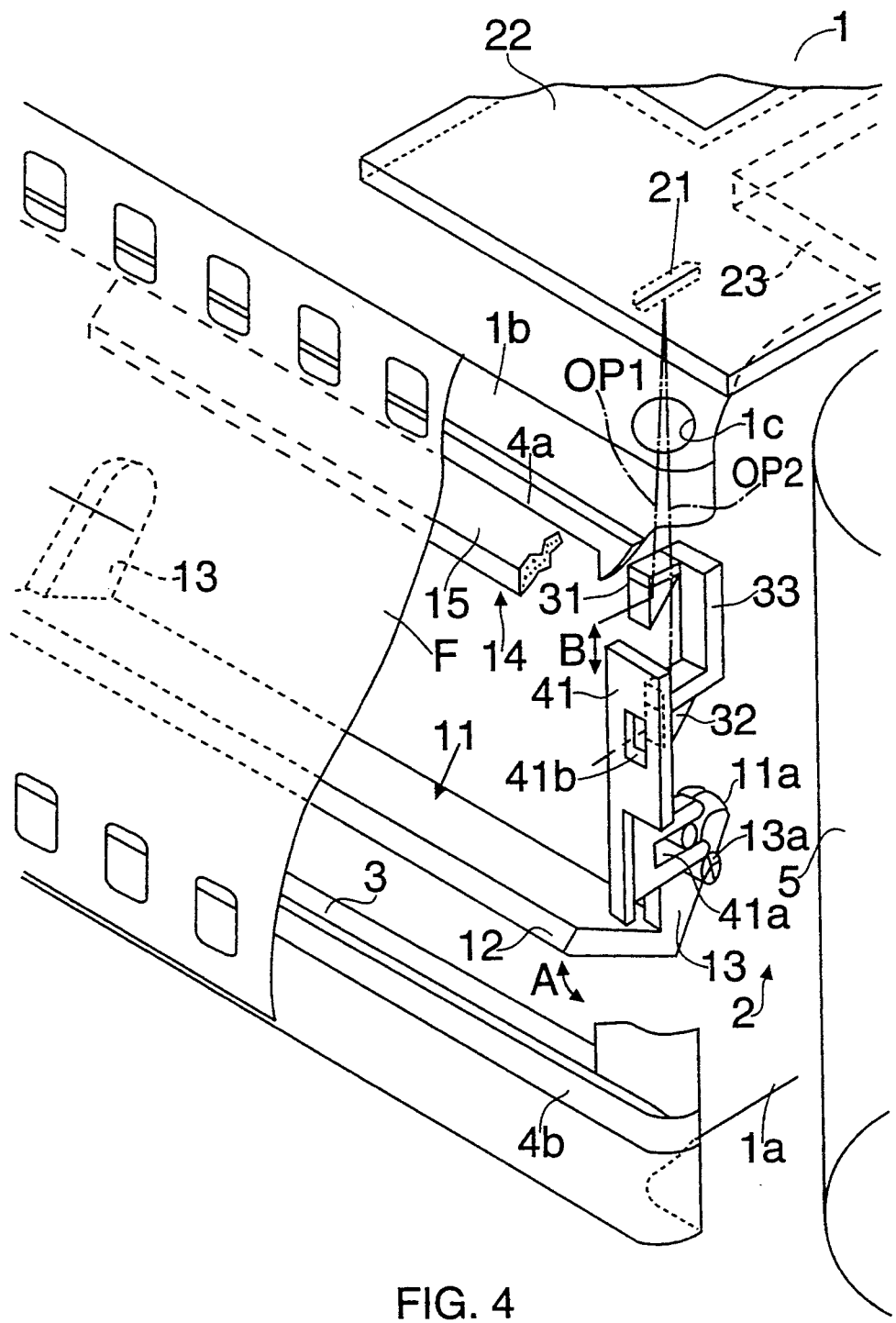
FIG. 4 is a perspective view of a second embodiment of a data imprinting device for a camera, according to the present invention.

Referring to FIG. 4, a second embodiment of the present invention provides for printing data in two locations on a film F. Camera body 1 includes spool chamber 2 separated from the rest of the camera body 1 by partitioning wall 1a. Rear surface 1b of camera body 1 includes rectangular aperture 3, through which film F is drawn to permit exposure of its photosensitive surface. Rails 4a and 4b are disposed along both an upper end and a lower end of rectangular aperture 3. A cylindrical spool 5, which has a longitudinal axis in the same direction as the longitudinal axis of camera body 1, is attached in spool chamber 2. Film F, is exposed through rectangular aperture 3, and is wound on cylindrical spool 5 as film F is carried upon rails 4a and 4b.

A lower light-shading frame 11 switches the screen size. Lower light-shading frame 11 includes a light-shading plate 12 and a pair of supporting plates 13, light-shading plate 12 is extended along rectangular aperture 3. A pair of supporting plates 13 protrudes at both a left end and a right end of lower light-shading frame 11. Supporting plate 13 is rotatably attached at a shaft 13a, which in turn is supported by camera body 1. Lower light-shading frame 11 is controlled by a screen size switching mechanism (not shown). In a full size screen mode, light shading plate 12 is rotated by shaft 13a, as shown by arrow A, down over lower end of rectangular aperture 3. In a panorama screen mode, light-shading plate 12 rotates to a predetermined location to prohibit incoming light from hitting film F.

An upper light-shading frame 14 is disposed at the upper end of rear surface 1b. Light-shading frame 14 is rotatably attached in the same way as lower light-shading frame 11. The screen size switching mechanism controls the movement of a light-shading plate 15. In the full size screen mode, light-shading plate 15 rotates into rectangular aperture 3 exposing an upper portion of film F. In the panorama screen mode, light-shading plate 15 rotates to a predetermined location to occlude incident light from exposing film F. A full-size picture is exposed when light-shading plates 12 and 15 rotate to both upper and lower ends of rectangular aperture 3, respectively. The picture taken is the same size as rectangular aperture 3. A panorama picture is taken when light-shading plates 12 and 15 occlude an upper and lower part of rectangular aperture 3, respectively.

Figure 7:
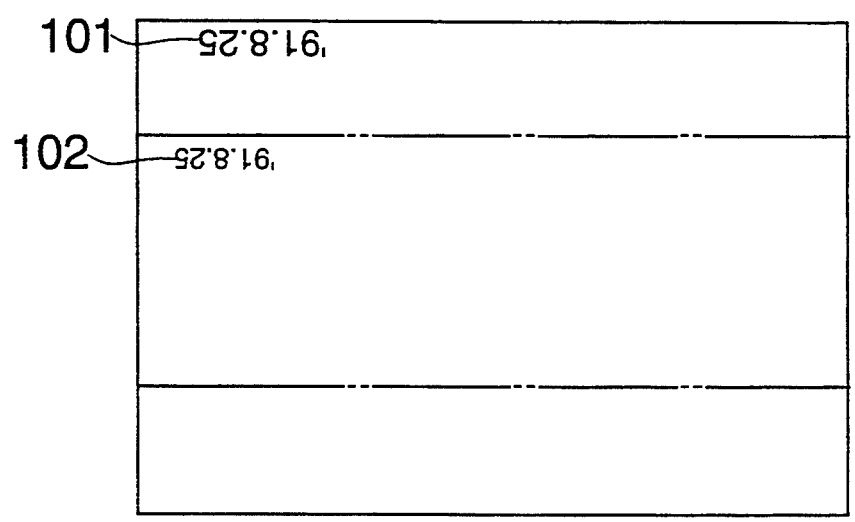
FIG. 7 is an illustration of the full size and panorama views of the data imprinting device as shown in FIG. 4.

A data imprinting device further includes light emitting element 21. Light emitting element 21 includes LEDs disposed in a linear arrangement on base 22. A control circuit (not shown) can independently drive each LED. As shown in FIG. 7, the independent control enables data 101 and 102 to be imprinted on a film F. The LEDs are aligned in a perpendicular direction to a film F.

Referring again to FIG. 4, driving circuit 23 is disposed on base 22. Driving circuit 23 causes light emitting element 21 to light on selectively according to a control signal from the control circuit (not shown). The control signal is generated synchronously with a winding of film F. Data is imprinted on a film F in response to a selective driving of light emitting elements 21. Light beams from light emitting element 21 are incident upon a first prism 31 and a second prism 32 through a through-hole 1c of camera body 1. The light beams are reflected by first prism 31 and second prism 32. The light beams are then focused onto film F. First prism 31 is a first imaging optical member and second prism 32 is a second imaging optical member.

Figure 5:
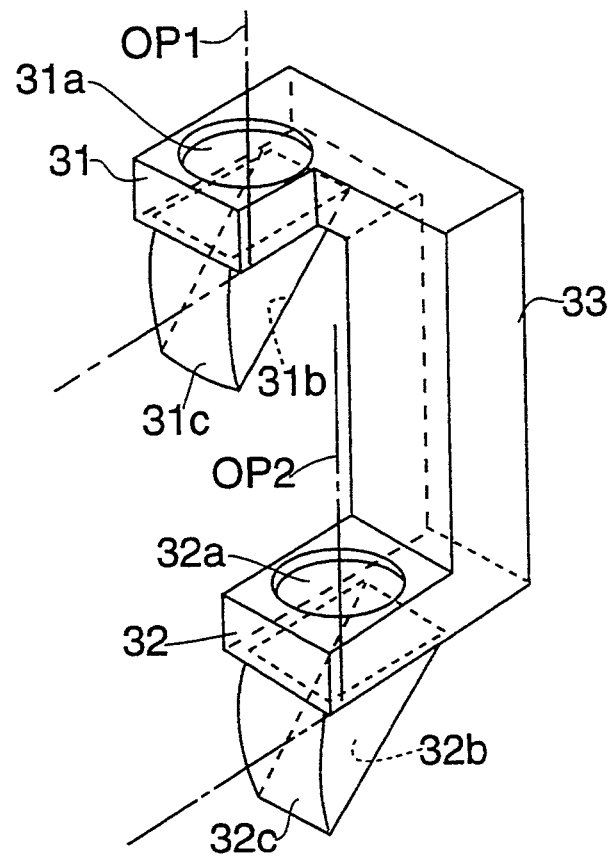
FIG. 5 is a cut-a-way perspective view of the data imprinting device shown in FIG. 4.
Figure 6:
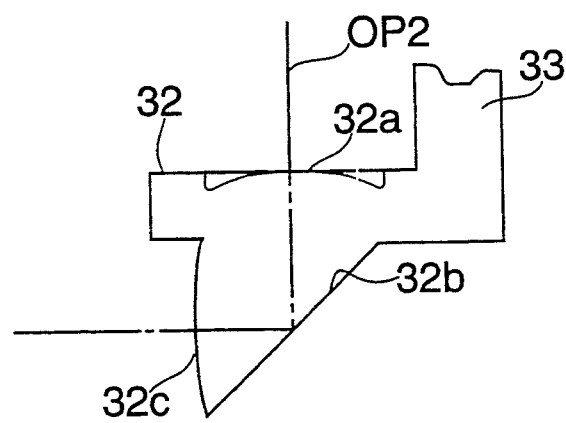
FIG. 6 is a cross sectional view of a data imprinting device as shown in FIG. 4.

Referring to FIGS. 5 and 6, first and second prisms, 31 and 32, are described in more detail. First prism 31 includes a first prism lens 31a, a beam-reflecting surface 31b and a second prism lens 31c. First prism 31 focusses the light beams in the full size screen mode. Second prism 32 includes a first prism lens 32a, beam-reflecting surface 32b and second prism lens 32c. Second prism 32 focusses the light beams for the panorama screen mode. The paths of the light beams in each mode are represented by dashed lines OP1 and OP2, respectively. First prism lenses 31a and 32a collect the light beams from light emitting element 21. Beam-reflecting surfaces 31b and 32b reflect the light beams at a 90° angle. Beam-reflecting surfaces 31b and 32b refract the light beams to second prism lenses 31c and 32c, which focus the light beams toward and onto film F.

Additionally, a coupling member 33 is disposed such that light beam paths OP1 and OP2 are not interrupted. First prism 31 and second prism 32 are integrally attached to coupling member 33. First prism 31, second prism 32, and coupling member 33 are formed integrally by an injection molding process. Alternatively, the individual pieces are integrated together by adhesion. The resulting piece is then attached to camera body 1.

Returning now to FIG. 4, a mask 41 is disposed at the front of second prism 32 in camera body 1. A slit 41a is formed at the lower side of mask 41. A driving pin 11a is disposed on lower light-shading plate 11. Slit 41a is connected to driving pin 11a to allow an upward and downward movement according to the rotation of lower light-shading plate 11. In the panorama screen mode, when mask 41 moves up according to the upper movement of lower light-shading plate 11, a rectangular hole 41b of mask 41 faces second prism 32. Thus, the light beam passing through second prism 32 can be focused toward and onto film F. In this case, light beams from both first prism 31 and second prism 32 can strike film F. However, as shown in FIG. 7, the light beam from the first prism 31 does not strike film F in the panorama screen mode. In the full size screen mode, mask 41 moves down to block the light beam from second prism 32.

As described above, first prism 31 and second prism 32 are integrally formed. Therefore, only first prism 31 or second prism 32 has to be attached exactly to camera body 1 such that the light beam passes correctly through to film F. Thus, the time and effort required is reduced in comparison to an arrangement having two prisms have to be separately attached to the camera body 1. In addition, the number of elements are decreased. This results in higher reliability because of fewer mistakes.

Embodiments of the present invention having more than two screen modes are realizable by those skilled in the art. Similarly, a camera having full size and half size screen modes are realizable. Such embodiments are considered to be within the spirit and scope of the present invention.

The foregoing embodiment imprints data at different locations for different screen modes. However, it may at times be desirable to imprint multiple pieces of data on a single photograph. A problem exists in that the an amount of light emerging from an optical system must be the same for each optical member of the optical system. The prior art has attempted to control and focus the light beams by using a diaphragm supported on an additional element. This increases production costs.

When a beam of light from a light emitting source comes into an optical member, a numerical aperture (hereinafter NA) is defined at the incident beam side by the following expression:

$$NA = 2n \cdot \sin \theta$$

where the angle $\theta$ defines an angle of an incident light beam and n defines an index of refraction of a lens. If the NA is the same for each optical member, then the brightness of the light beams emerging from the optical members will be the same. This ensures proper exposure for a plurality of optical members.

Second, the relationship between an effective aperture D and a distance L between effective aperture D and the light emitting source is defined as:

$$\tan \theta = D/L$$

Therefore, where the relationship D/L is constant, the NA is also constant.

In a third embodiment of the present invention, effective apertures of the incident surfaces of optical members are designed with respect to the distances between the effective apertures and the light emitting source, to effect a constant NA resulting in proper exposure for all data imprinting locations.

Figure 8:
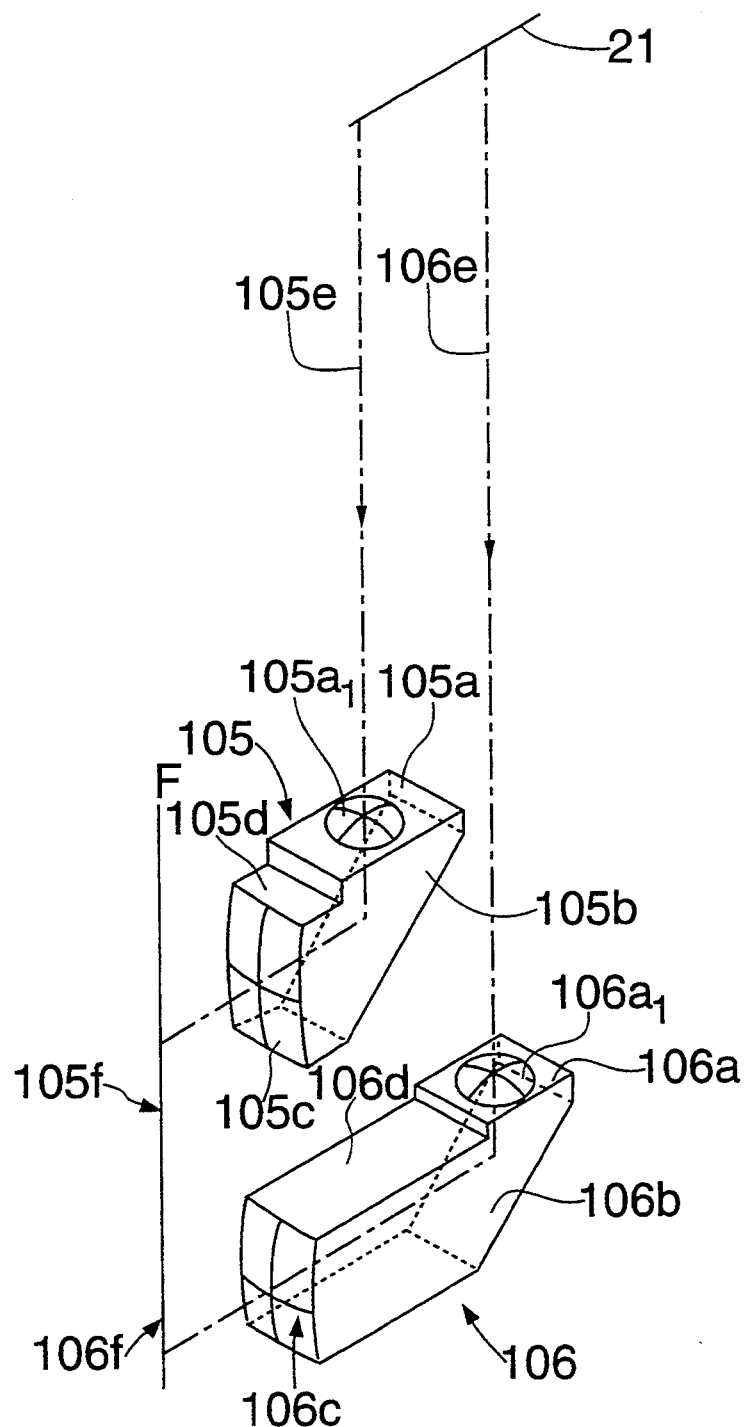
FIG. 8 is a perspective view of a third embodiment of a data imprinting device for a camera, according to the present invention.

Referring to FIG. 8, the third embodiment of the invention includes light emitting element 21 having a plurality of LEDs linearly disposed having a wave length of 585 nm. A first imaging lens 105 includes an incidence plane 105a, which has an effective aperture 105$a_1$. First imaging lens 105 further includes a reflection plane 105b to transmit an incident light beam toward an emerging plane 105c. An upper extension 105d is disposed in a plane parallel with the light beam transmitted from reflection plane 105b to emerging plane 105c. An optical axis 105e defines the path of the incoming and outgoing light beam. The light beam emerging from first imaging lens 105 is focused upon a film F at point 105f.

A second imaging lens 106 includes an incidence plane 106a, which has an effective aperture 106$a_1$. Second imaging lens 106 further includes a reflection plane 106b to reflect an incident light beam toward an emerging plane 106c. An upper extension 106d is disposed in a plane parallel with the light beam transmitted from reflection plane 106b to emerging plane 106c. An optical axis 106e defines the path of the incoming and outgoing light beam. The light beam emerging from second imaging lens 106 is focused toward point 106f on a film F.

Figure 9:
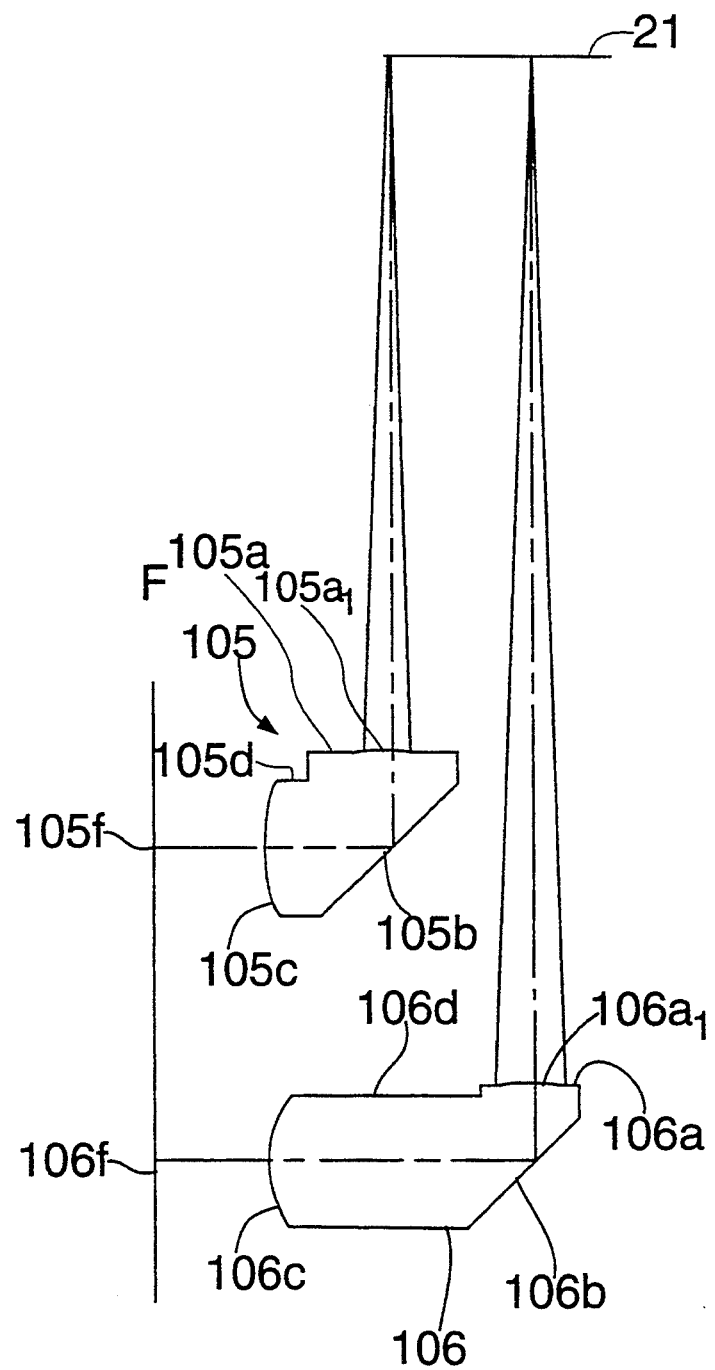
FIG. 9 is a cross sectional view of a data imprinting device as shown in FIG. 8.

Referring to FIG. 9, the light beam from light emitting element body 21 impinges on first imaging lens 105. Incidence plane 105a has a mask (not shown) which produces the effective aperture 105$a_1$. Reflection plane 105b reflects the beam passing through effective aperture 105$a_1$ toward film F. The reflected beam passes through a lens medium and comes out at emerging plane 105c, being focused at point 105f on film F. Similarly, the beam of light from light emitting element 21 impinges on second imaging lens component 106. Incidence plane 106a has a second mask (not shown) which produces the effective aperture 106$a_1$. Reflection plane 106b reflects the beam passing through effective aperture 106$a_1$ toward film F. The reflected beam passes through the lens medium and comes out at emerging plane 106c, being focused at point 106f on film F.

Emerging plane 105c of first imaging lens 105 and emerging plane 106c of second imaging lens 106 are parallel with film F. Emerging planes 105c and 106c are equidistant from film F. Upper extension 106d of second imaging lens 106 is longer than upper extension 105d of first imaging lens 105. The optical axis 105e and 106e are in the same plane as the linearly disposed LEDs. First imaging lens 105 and second imaging lens 106 are disposed such that light beams are unobstructed from impinging on incident planes 105a and 106a.

Figure 10:
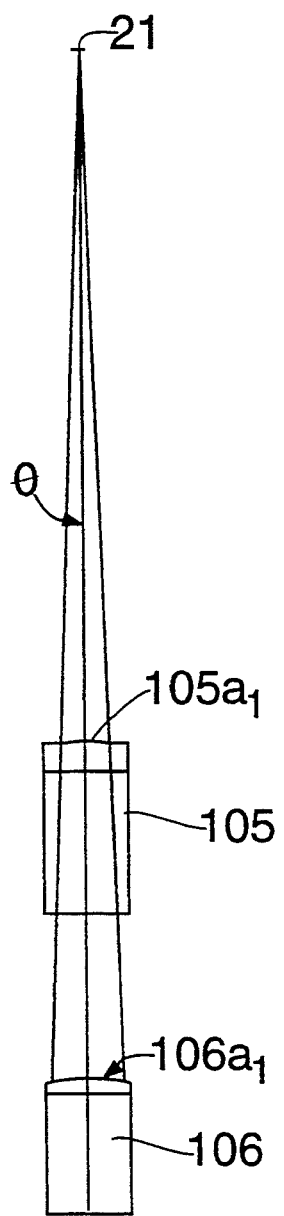
FIG. 10 is a front view of a data imprinting device as shown in FIG. 8.

Referring to FIG. 10, the inclination of first imaging lens 105 is identical to second imaging lens 106. This means that the NAs for the first imaging lens 105 and second imaging lens 106 are also identical. This ensures proper exposure.

First imaging lens 105 and second imaging lens 106 are constructed as follows. The light emitting source is represented by surface (0) below. One surface of the optical member has to be an aspherical surface. Other surfaces of the optical members can be either aspherical or spherical surfaces. A first surface (represented by 1 below) corresponding to an effective aperture 105$a_1$ of first imaging lens 105 and a second surface (represented by 2 below) corresponding to the emerging plane 106c of second imaging lens 106, which have aspherical shapes, are satisfied with the following expression:

$$x = cy^2/\{1 + (1 - \kappa c^2 y^2)^{\frac{1}{2}}\} + C_4 y^4 + C_6 y^6 + \ldots$$

where the optical axis 105e and 106e are defined as a X axis. The positive X direction being the direction of the incident light beam. The Y axis is the direction perpendicular to the optical axis 105e and 106e. The curvature of the paraxial rays is represented by c. That is, c is the reciprocal to a curvature radius R on the lens surface. $\kappa$ is a parameter for a quadric surface. Finally, $C_4$ and $C_6$ are constants for an aspherical surface.

First imaging lens 105 has the following specifications:

Effective diameter of a first surface: 0.68 mm
Imaging enlargement: −0.3067×
Numerical aperture: 0.0663

| Surface no. | Curvature radius | Distance between surfaces | Refraction |
|---|---|---|---|
| 0 | 0.0000 | 0,1 → 10.20 | |
| 1 | 1.6117 | 1,2 → 3.20 | 1.48827 |
| 2 | −2.3804 | 2,F → 1.60 | |

The following values are used to produce the aspherical shape for the first surface:

$c = 1/R$  $\kappa = 0.0943$  $C_4 = -8.6122 \times 10^{-3}$
$C_6 = -4.1953 \times 10^{-2}$  $C_8 = 2.7550 \times 10^{-1}$
$C_{10} = -3.1325 \times 10^{-1}$ Second imaging lens 106 has the following specification:
Effective diameter of a first surface: 1.00 mm
Imaging enlargement: −0.1579×
Numerical aperture: 0.0663.

| Surface no. | Curvature radius | Distance between surfaces | Refraction |
|---|---|---|---|
| 0 | 0.0000 | 0,1 → 15.00 | |
| 1 | 3.5012 | 1,2 → 4.90 | 1.48827 |
| 2 | −1.0621 | 3,F → 1.70 | |

Figure 11:
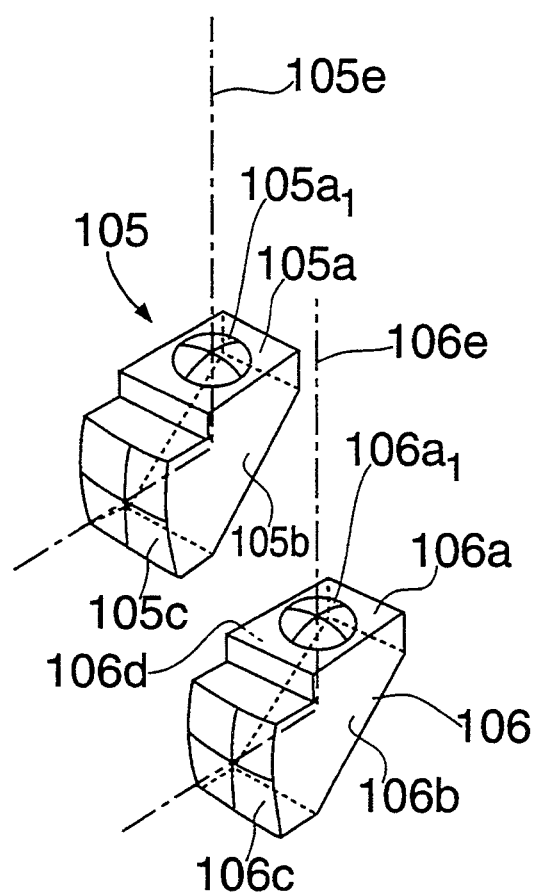
FIG. 11 is a perspective view of a fourth embodiment of a data imprinting device for a camera, according to the present invention.

The following values are used to produce the aspherical shape for the second surface:

$c = 1/R$  $\kappa = 0.0274$  $C_4 = 9.9404 \times 10^{-2}$
$C_6 = -6.6446 \times 10^{-3}$  $C_8 = -6.4011 \times 10^{-1}$
$C_{10} = 4.6509 \times 10^{-2}$ Referring to FIG. 11, in a fourth embodiment of this invention, light emitting element 21 includes a plurality of LEDs linearly disposed having a wave length of 585 nm. A first imaging lens 105 includes an incidence plane 105a, which has an effective aperture 105a$_1$. First imaging lens 105 further includes a reflection plane 105b to transmit an incident light beam toward an emerging plane 105c. An upper extension 105d is disposed in a plane parallel with the light beam transmitted from reflection plane 105b to emerging plane 105c. An optical axis 105e defines the path of the incoming and outgoing light beam. The light beam emerging from first imaging lens 105 is focused upon a film F at point 105f.

A second imaging lens 106 includes an incidence plane 106a, which has an effective aperture 106a$_1$. Second imaging lens 106 further includes a reflection plane 106b to reflect an incident light beam toward an emerging plane 106c. An upper extension 106d is disposed in a plane parallel with the light beam transmitted from reflection plane 106b to emerging plane 106c. An optical axis 106e defines the path of the incoming and outgoing light beam. The light beam emerging from second imaging lens 106 is focused toward point 106f on a film F.

Figure 12:
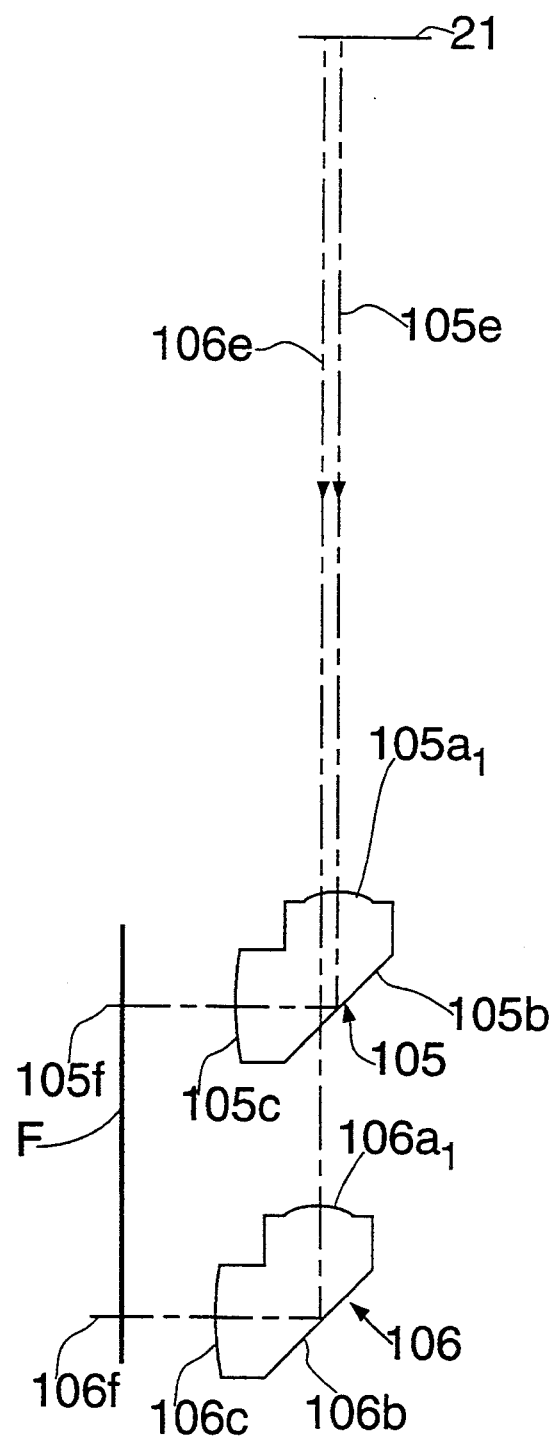
FIG. 12 is a cross sectional view of a data imprinting device as shown in FIG. 11.

Referring to FIG. 12, light emitting element 21 emits light toward first imaging lens 105. Incidence plane 105a has a mask (not shown) which produces effective aperture 105a$_1$. Reflection plane 105b of lens component 105 reflects the light beam passing through effective aperture 105a$_1$ toward film F. The reflected light beam passes through the lens medium and emerges at emerging plane 105c. Similarly, light beams from light emitting element 21 impinge on second imaging lens 106. Incidence plane 106a has a second mask (not shown), which produces effective aperture 106a$_1$. Reflection plane 106b reflects the light beam passing through effective aperture 106a$_1$ toward film F. The reflected light beam emerges out of emerging plane 106c and is focused at point 106f on film F.

Figure 13:
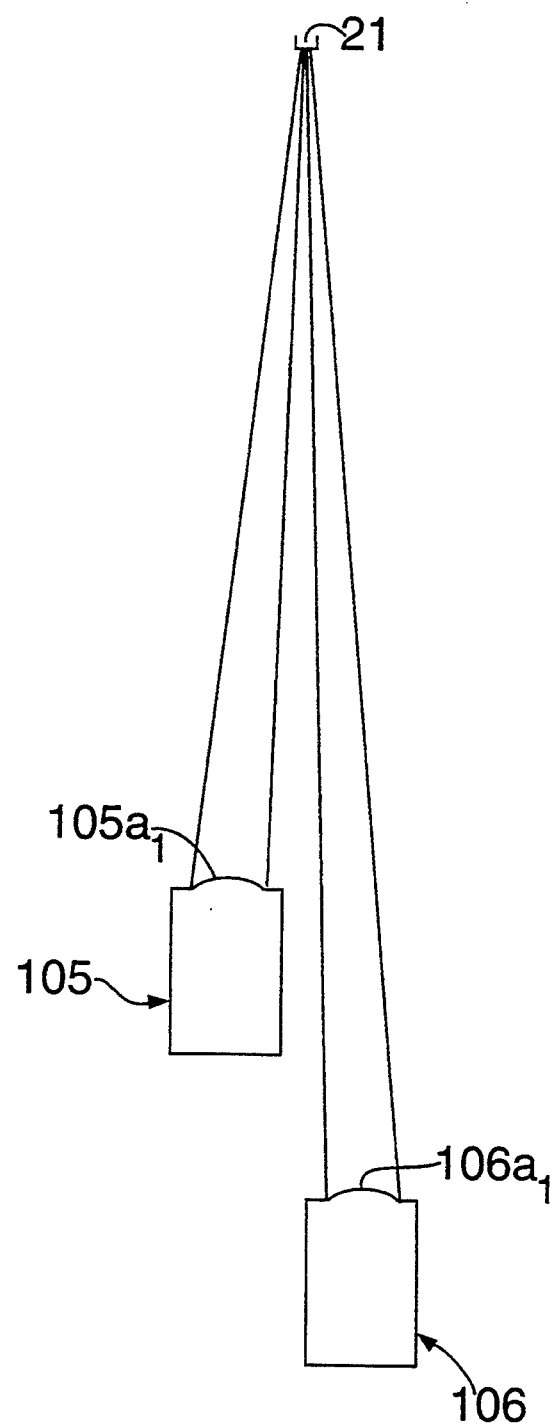
FIG. 13 is a front view of a data imprinting device as shown in FIG. 11.

Emerging plane 105c of first imaging lens 105 and emerging plane 106c of second imaging lens 106 are located in parallel with film F. Referring to FIG. 13, first imaging 105 and second imaging lens 106 are disposed such that incident light beams are not interfered with by the other. The optical axis 105e and 106e lie in a plane parallel with film F. The inclination in first imaging lens 105 and second imaging lens 106 are equivalent. This means that the NAs are the same.

First imaging lens 105 and second imaging lens 6 are constructed as follows. The light emitting source is represented by surface (0) below. One surface of the optical member has to be an aspherical surface. Other surfaces of the optical members can be either aspherical or spherical surfaces. A first surface (represented by 1 below) corresponding to the emerging plane 105c of first imaging lens 105 and a first surface represented by 2 below) corresponding to the effective aperture 106a$_1$ of second imaging lens 106, which have aspherical shapes, are satisfied with the following expression:

$$x = cy^2/\{1+(1-\kappa c^2 y^2)^{1/2}\} + C_4 y^4 + C_6 y^6 + \ldots$$

where an optical axis 105e and 106e is defined as the X axis. The positive direction being the direction of the incident light beam. Y axis is the direction perpendicular to the optical axis 105e and 106e. The curvature of the paraxial rays is represented by c. That is, c is the reciprocal to a curvature radius R on the lens surface. $\kappa$ is a parameter for a quadric surface. Finally, $C_4$ and $C_6$ are constants for an aspherical surface.

First imaging lens 105 has the following specification:
Effective diameter of a first surface: 1.00 mm
Imaging enlargement: −0.2584×
Numerical aperture: 0.0804

| Surface no. | Curvature radius | Distance between surfaces | Refraction |
|---|---|---|---|
| 0 | 0.0000 | 0,1 → 12.43 | |
| 1 | 1.5893 | 1,2 → 3.15 | 1.48827 |
| 2 | −3.0005 | 2,F → 1.65 | |

The following values are used for producing the aspherical shape of the first surface.

$c = 1/R$  $\kappa = 0.2336$  $C_4 = -6.6008 \times 10^{-2}$
$C_6 = 4.0468 \times 10^{-1}$  $C_8 = -7.9125 \times 10^{-1}$
$C_{10} = 4.6599 \times 10^{-1}$ Second imaging lens component 106 has the following specifications:
Effective diameter of a first surface: 1.35 mm
Imaging enlargement: −0.1781×
Numerical aperture: 0.0804

| Surface no. | Curvature radius | Distance between surfaces | Refraction |
|---|---|---|---|
| 0 | 0.0000 | 0,1 → 16.91 | |
| 1 | 1.5629 | 1,2 → 3.05 | 1.48827 |
| 2 | −3.0005 | 2,F → 1.41 | |

The following values are used for producing the aspherical shape of the first surface.

| | | |
|---|---|---|
| $c = 1/R$ | $\kappa = -0.026$ | $C_4 = 2.3425 \times 10^{-2}$ |
| $C_6 = -1.5024 \times 10^{-3}$ | | $C_8 = 4.3192 \times 10^{-2}$ |
| $C_{10} = -3.8167 \times 10^{-2}$ | | |

In the third and fourth embodiments of this invention, two imaging lens components were utilized. However, it is possible to attach more than two imaging lens in the optical system.

A fifth embodiment of the invention has optical imaging elements wherein a transmittance T of each element is controlled to produce uniform exposures at differing locations. When a light beam from a light source impinges on an optical member, a NA on the film side, is satisfied by the following expression:

$$NA = 2n \cdot \sin \theta$$

where $\theta$ is an angle of the light beam and n is an index of refraction of the optical member. The NA and the transmittance T are related by the following expressions:

$$(NA_{K+1}/NA_K)^2 = T_K/T_{K+1}$$

then, $$(NA_K)^2 \cdot T_K = (NA_{K+1})^2 \cdot T_{K+1} \quad (1)$$

where $NA_K$ is defined as the numerical aperture of the Kth optical member (K=1, 2, 3 ...), and $T_K$ is defined as the transmittance of the Kth optical member (K=1, 2, 3 ...). When each NA of the optical members is constant, exposures of imprinted images are adjustable by varying the transmittance T of the optical members. The expression states that as a distance between the light emitting source and the optical member becomes larger, the transmittance T also has to become correspondingly larger. This is required because NA becomes larger as the distance is increased, but the effective aperture of the optical member remains the same. Therefore, the transmittance T of the optical member has to become larger. That is, as the distance between the light emitting source and the optical members increases or decreases, the transmittance T correspondingly increases and decreases.

More specifically, if the effective diameters of the two lenses are the same, then the NAs are inversely proportional to the distance L between the LEDs and the lenses. Where the lenses have numerical apertures NA1 and NA2, and NA1 > NA2, equation (1) provides that T2 > T1. Equation (1) is also valid where the effective diameters are different (i.e. D2 > D1).

Figure 14:
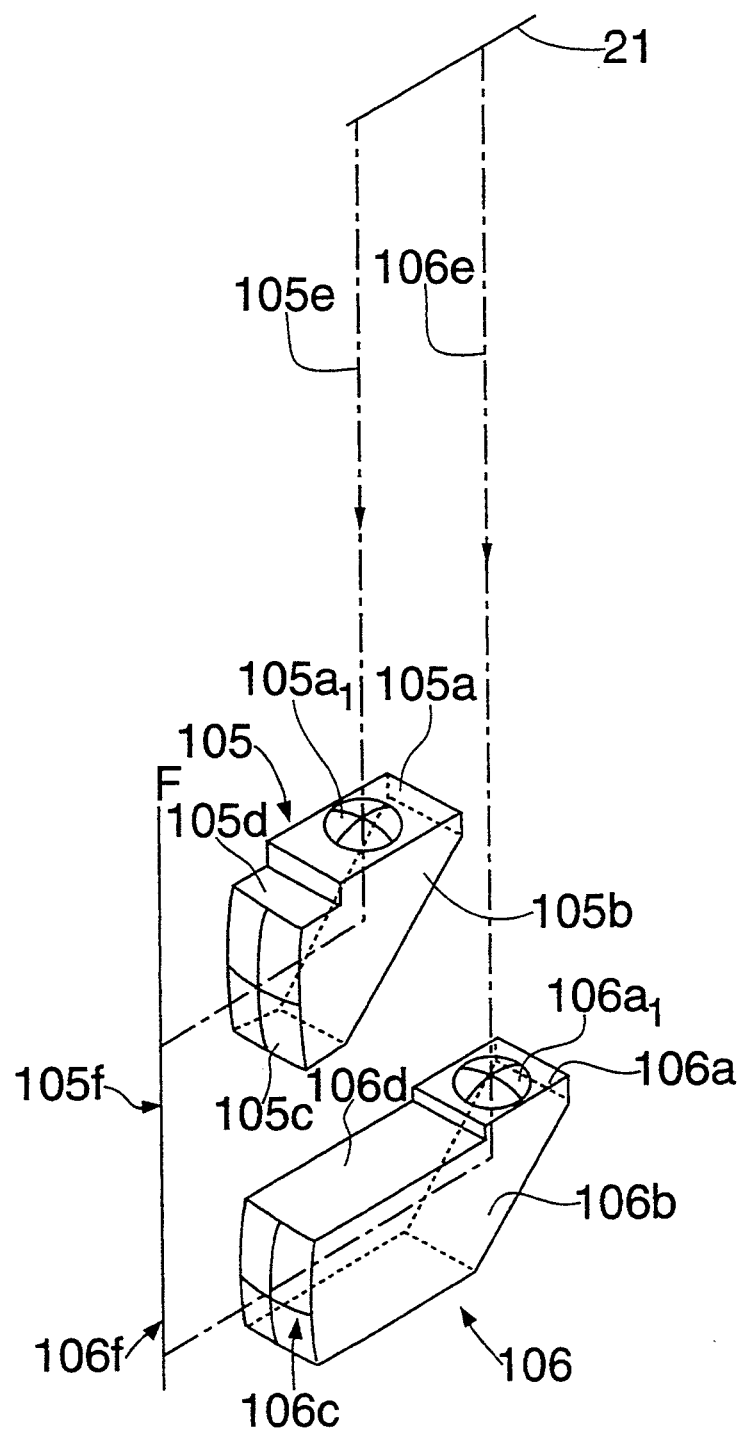
FIG. 14 is a perspective view of a fifth embodiment of a data imprinting device for a camera, according to the present invention.

Referring to FIG. 14, the fifth embodiment of the invention includes light emitting element 21 having LEDs linearly disposed with a wave length of 585 nm. A first imaging lens 105 includes an incidence plane 105a, which has an effective aperture 105$a_1$. First imaging lens 105 further includes a reflection plane 105b to transmit an incident light beam toward an emerging plane 105c. An upper extension 105d is disposed in a plane parallel with the light beam transmitted from reflection plane 105b to emerging plane 105c. An optical axis 105e defines the path of the incoming and outgoing light beam. The light beam emerging from first imaging lens 105 is focused upon a film F at point 105f.

A second imaging lens 106 includes an incidence plane 106a, which has an effective aperture 106$a_1$. Second imaging lens 106 further includes a reflection plane 106b to reflect incident light beam toward an emerging plane 106c. An upper extension 106d is disposed in a plane parallel with the light beam transmitted from reflection plane 106b to emerging plane 106c. An optical axis 106e defines the path of the incoming and outgoing light beam. The light beam emerging from second imaging lens 106 is focused toward point 106f on a film F.

Figure 15:
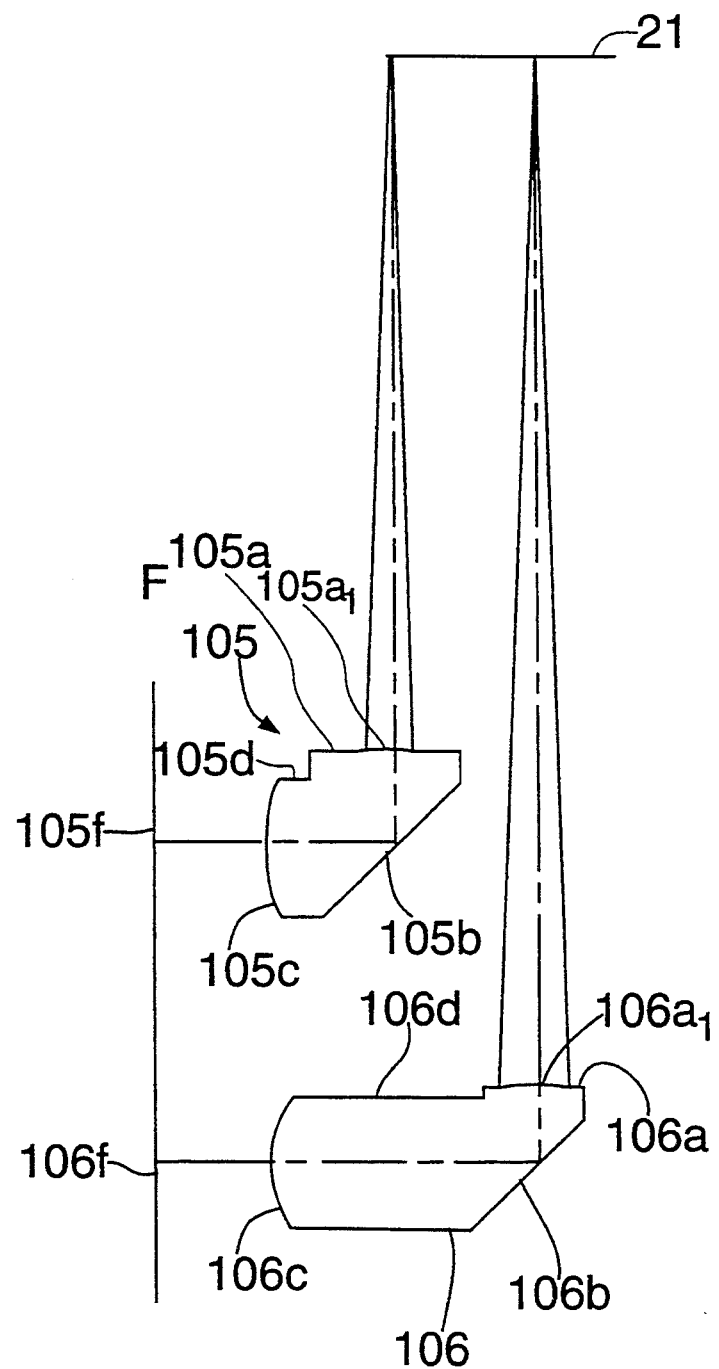
FIG. 15 is a cross sectional view of a data imprinting device as shown in FIG. 14.

Referring to FIG. 15, the light beam from light emitting element 21 impinges on first imaging lens 105. Incidence plane 105a has a mask (not shown) which produces the effective aperture 105$a_1$. Reflection plane 105b reflects the beam passing through effective aperture 105$a_1$ toward film F. The reflected beam passes through a lens medium and emerges at emerging plane 105c, being focused at point 105f on film F. Similarly, the beam of light from light emitting element 21 impinges on second imaging lens component 106. Incidence plane 106a has a second mask (not shown) which produces the effective aperture 106$a_1$. Reflection plane 106b reflects the beam passing through effective aperture 106$a_1$ toward film F. The reflected beam passes through the lens medium and emerges from emerging plane 106c, and is focused at point 106f on film F.

Emerging plane 105c of first imaging lens 105 and emerging plane 106c of second imaging lens 106 are parallel with film F. Emerging planes 105c and 106c are equidistant from film F. Upper extension 106d of second imaging lens 106 is longer than upper extension 105d of first imaging lens 105. The optical axis 105e and 106e are in the same plane as the linearly disposed LEDs. First imaging lens 105 and second imaging lens 106 are disposed such that light beams are unobstructed from impinging on incident planes 105a and 106a.

Figure 16:
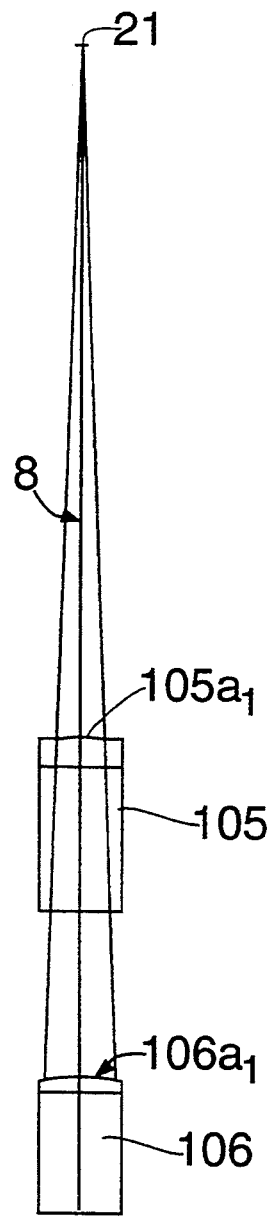
FIG. 16 is a front view of a data imprinting device as shown in FIG. 14.

Referring to FIG. 16, the inclination of first imaging lens 105 is identical to second imaging lens 106. This means that the NAs for the first imaging lens 105 and second imaging lens 106 are also identical. This ensures proper exposure.

First imaging lens 105 and second imaging lens 106 are constructed as follows. The light emitting source is represented by surface (0) below. One surface of the optical member has to be an aspherical surface. Other surfaces of the optical members can be either aspherical or spherical surfaces. A first surface (represented by 1 below) corresponding to an effective aperture 105$a_1$ of first imaging lens 105 and a second surface (represented by 2 below) corresponding to the emerging plane 106c of second imaging lens 106, which have aspherical shapes, are satisfied with the following expression:

$$x = cy^2 / \{1 + (1 - \kappa c^2 y^2)^{\frac{1}{2}}\} + C_4 y^4 + C_6 y^6 \ldots$$

where the optical axis 105e and 106e are defined as a X axis. The positive X direction being the direction of the incident light beam. The Y axis is the direction perpendicular to the optical axis 105e and 106e. The curvature of the paraxial rays is represented by c. That is, c is the reciprocal to a curvature radius R on the lens surface. $\kappa$ is a parameter for a quadric surface. Finally, $C_4$ and $C_6$ are constants for an aspherical surface.

First imaging lens 105 has the following specifications:

Effective diameter of a first surface: 0.68 mm

Imaging enlargement: −0.3067×
Numerical aperture: 0.07811
Transmittance $T_1$: 69%
$NA_2 \cdot T_1$: 0.00421

| Surface no. | Curvature radius | Distance between surfaces | Refraction |
|---|---|---|---|
| 0 | 0.0000 | 0,1 → 10.20 | |
| 1 | 1.6117 | 1,2 → 3.20 | 1.48827 |
| 2 | −2.3804 | 2,F → 1.60 | |

The following values are used for producing a aspherical shape of a first surface.

$c = 1/R$  $\kappa = 0.0943$  $C_4 = -8.6122 \times 10^{-3}$
$C_6 = -4.1953 \times 10^{-2}$  $C_8 = 2.7550 \times 10^{-1}$
$C_{10} = -3.1325 \times 10^{-1}$ Second imaging lens 106 has the following specifications:
Effective diameter of a first surface: 1.00 mm
Imaging enlargement: −0.1579×
Numerical aperture: 0.0666
Transmittance $T_2$: 95%
$NA^2 \cdot T_2$: 0.00421.

| Surface no. | Curvature radius | Distance between surfaces | Refraction |
|---|---|---|---|
| 0 | 0.0000 | 0,1 → 15.00 | |
| 1 | 3.5012 | 1,2 → 4.90 | 1.48827 |
| 2 | −1.0621 | 2,F → 1.70 | |

The following values are used for producing a aspherical shape of a second surface.

Figure 17:
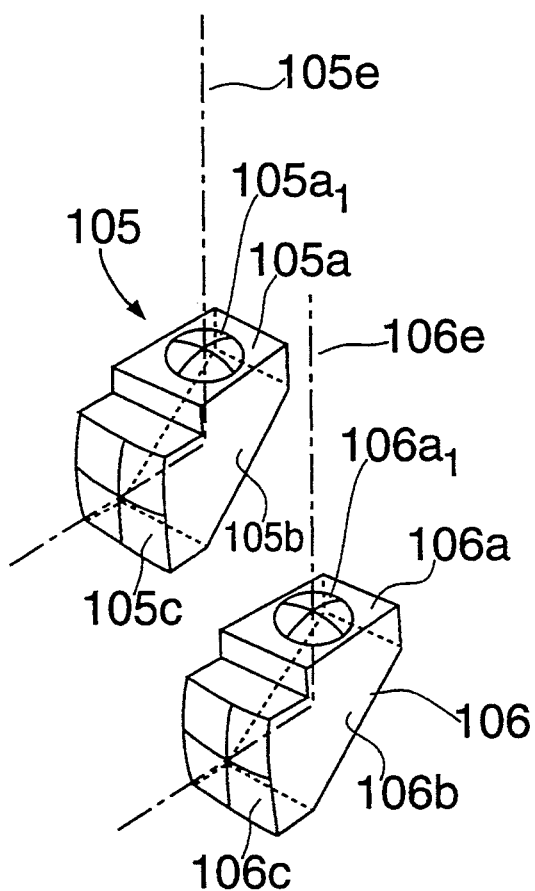
FIG. 17 is a perspective view of a sixth embodiment of a data imprinting device for a camera, according to the present invention.

$c = 1/R$  $\kappa = 0.0274$  $C_4 = 9.9404 \times 10^{-2}$
$C_6 = -6.6446 \times 10^{-3}$  $C_8 = -6.4011 \times 10^{-2}$
$C_{10} = 4.6509 \times 10^{-2}$ Referring to FIG. 17, in a sixth embodiment of this invention, light emitting element 21 includes LEDs linearly disposed having a wave length of 585 nm. A first imaging lens 105 includes an incidence plane 105a, which has an effective aperture 105a₁. First imaging lens 105 further includes a reflection plane 105b to transmit an incident light beam toward an emerging plane 105c. An upper extension 105d is disposed in a plane parallel with the light beam transmitted from reflection plane 105b to emerging plane 105c. An optical axis 105e defines the path of the incoming and outgoing light beam. The light beam emerging from first imaging lens 105 is focused upon a film F at point 105f.

A second imaging lens 106 includes an incidence plane 106a, which has an effective aperture 106a₁. Second imaging lens 106 further includes a reflection plane 106b to reflect incident light beam toward an emerging plane 106c. An upper extension 106d is disposed in a plane parallel with the light beam transmitted from reflection plane 106b to emerging plane 106c. An optical axis 106e defines the path of the incoming and outgoing light beam. The light beam emerging from second imaging lens 106 is focused toward point 106f on a film F.

Figure 18:
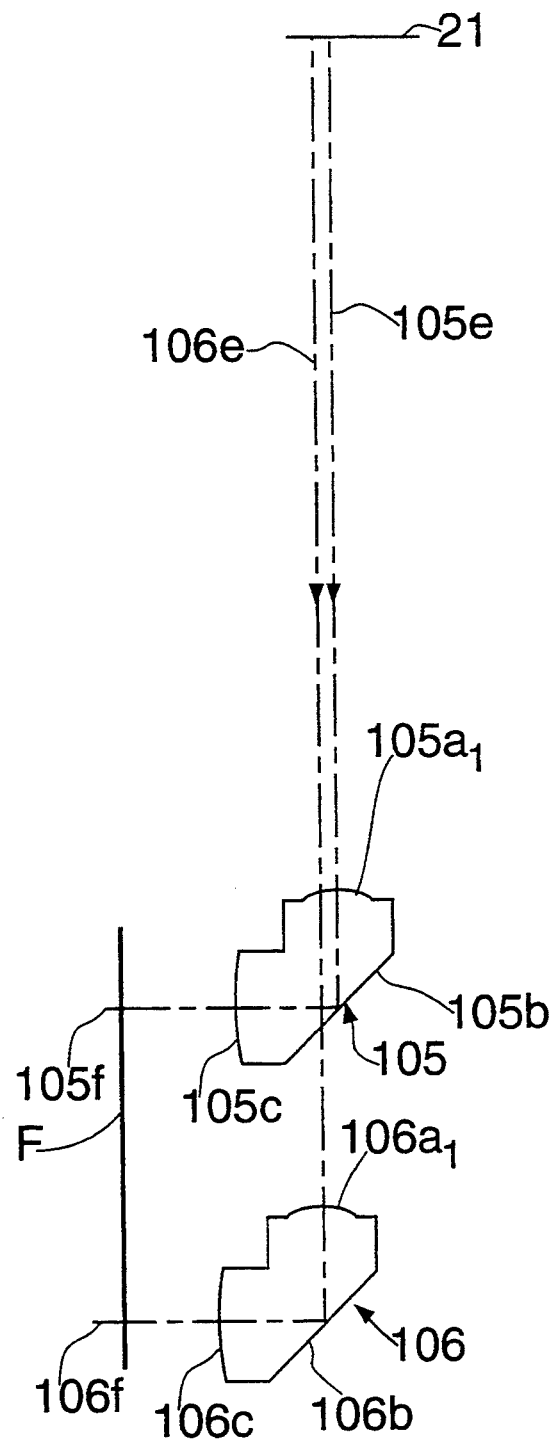
FIG. 18 is a cross sectional view of a data imprinting device as shown FIG. 17.

Referring to FIG. 18, light emitting element 21 emits light toward first imaging lens 105. Incidence plane 105a has a mask (not shown) which produces effective aperture 105a₁. Reflection plane 105b of lens component 105 reflects the light beam passing through effective aperture 105a₁ toward film F. The reflected light beam passes through the lens medium and emerges at emerging plane 105c. Similarly, light beams from light emitting element 21 impinge on second imaging lens 106. Incidence plane 106a has a second mask (not shown), which produces effective aperture 106a₁. Reflection plane 106b reflects the light beam passing through effective aperture 106a₁ toward film F. The reflected light beam emerges out of emerging plane 106c and is focused at point 106f on film F.

Emerging plane 105c of first imaging lens 105 and emerging plane 106c of second imaging lens 106 are located parallel with film F. Referring to FIG. 13, first imaging 105 and second imaging lens 106 are disposed such that incident light beams are not interfered with by the other. The optical axis 105e and 106e lie in a plane parallel with film F.

Figure 19:
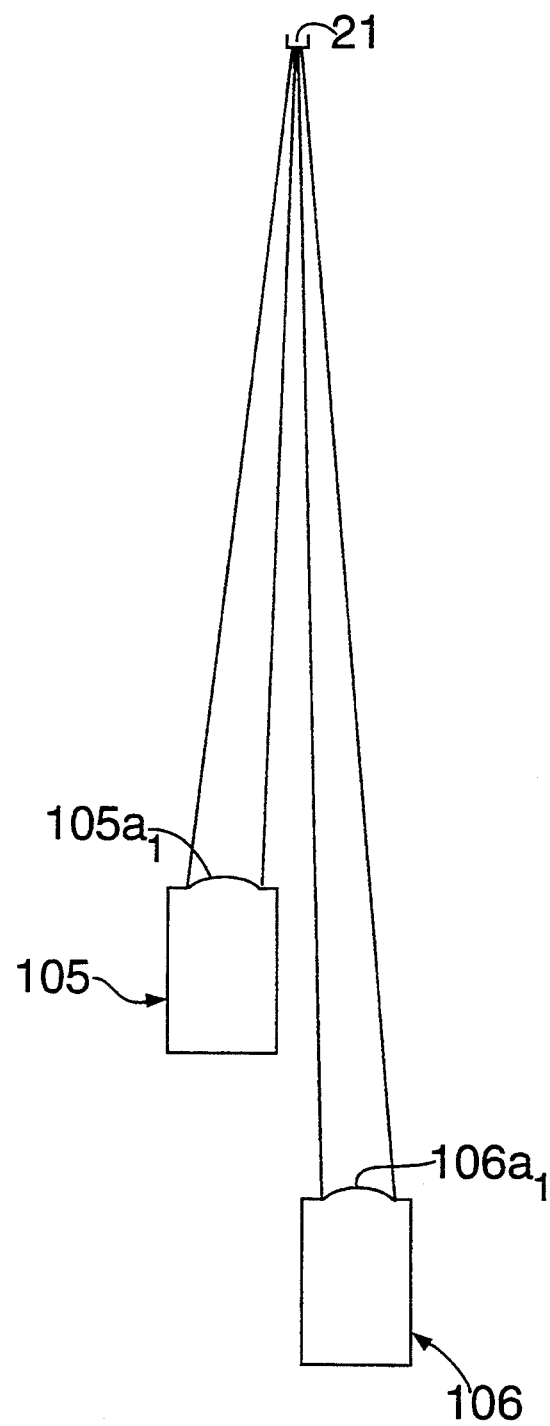
FIG. 19 is a front view of a data imprinting device as shown FIG. 17.

Referring to FIG. 19, the effective aperture 105a₁ of first imaging lens 105 is the same as that of second imaging lens 106. The transmittance of first imaging lens 105 and second imaging lens 106 are changed, so as to ensure proper exposure.

First imaging lens 105 and second imaging lens 6 are constructed as follows. The light emitting source is represented by surface (0) below. One surface of the optical member has to be an aspherical surface. Other surfaces of the optical members can be either aspherical or spherical surfaces. A first surface (represented by 1 below) corresponding to the emerging plane 105c of first imaging lens 105 and a first surface represented by 2 below) corresponding to the effective aperture 106a₁ of second imaging lens 106, which have aspherical shapes, are satisfied with the following expression:

$$x = cy^2 / \{1 + (1 - \kappa c^2 y^2)^{\frac{1}{2}}\} + C_4 y^4 + C_6 y^6 + \ldots$$

where an optical axis 105e and 106e is defined as the X axis. The positive direction being the direction of the incident light beam. Y axis is the direction perpendicular to the optical axis 105e and 106e. The curvature of the paraxial rays is represented by c. That is, c is the reciprocal to a curvature radius R on the lens surface. $\kappa$ is a parameter for a quadric surface. Finally, $C_4$ and $C_6$ are constants for an aspherical surface.

First imaging lens component 105 has the following specifications:
Effective diameter of a first surface: 1.00 mm
Imaging enlargement: −0.2584×
Numerical aperture: 0.0805
Transmittance $T_1$: 50%
$NA^2 \cdot T_1$: 0.00324

| Surface no. | Curvature radius | Distance between surfaces | Refraction |
|---|---|---|---|
| 0 | 0.0000 | 0,1 → 12.43 | |
| 1 | 1.5893 | 1,2 → 3.15 | 1.48827 |
| 2 | −3.0005 | 2,F → 1.65 | |

The following values are used for producing an aspherical shape of the first surface.

$c = 1/R$  $\kappa = 0.2336$  $C_4 = -6.6008 \times 10^{-2}$
$C_6 = 4.0468 \times 10^{-1}$  $C_8 = -7.9125 \times 10^{-1}$
$C_{10} = 4.6599 \times 10^{-1}$ The following values are used for producing an aspherical shape of the first surface.

Second imaging lens 106 has the following specifications:

Effective diameter of a first surface: 1.00 mm
Imaging enlargement: $-0.1781\times$
Numerical aperture: 0.0591
Transmittance $T_2$: 92.8%
$NA^2 \cdot T_2$: 0.00324

| Surface no. | Curvature radius | Distance between surfaces | Refraction |
|---|---|---|---|
| 0 | 0.0000 | 0,1 → 16.91 | |
| 1 | 1.5629 | 1,2 → 3.05 | 1.48827 |
| 2 | −3.0005 | 2,F → 1.41 | |

$c = 1/R$  $\kappa = -0.026$  $C_4 = 2.3425 \times 10^{-2}$
$C_6 = -1.5024 \times 10^{-3}$  $C_8 = 4.3192 \times 10^{-2}$
$C_{10} = -3.8167 \times 10^{-2}$ In the foregoing embodiments of the invention, two imaging lens components are utilized. It is acceptable to use more than two lens in the optical system.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A data imprinting device for a camera comprising:
 a diaphragm member;
 an optical member;
 said camera having a camera body;
 a light source for imprinting data on a film;
 said diaphragm member gathering light from said light source;
 said optical member reflecting and focusing said light upon said film;
 means for supporting said diaphragm member;
 means for mounting said optical member; and
 said means for supporting and said means for mounting being formed integrally with said camera body.

2. A data imprinting device for a camera according to claim 1 comprising:
 said camera body having a spool chamber; and
 said means for supporting being formed integrally with said camera body above said spool chamber.

3. A data imprinting device for a camera according to claim 1 comprising:
 said camera body having a spool chamber; and
 said means for supporting being a recess formed integrally with said camera body in a wall of said spool chamber.

4. A data imprinting device for a camera comprising:
 means for selecting a chosen mode of a first and a second screen size mode;
 a light source mounted in a body of said camera;
 means for driving said light source responsive to a movement of a film;
 a first optical member for focusing light from said light source upon said film at a first location, when said first screen size mode is selected, whereby an image is imprinted upon said film at said first location;
 a second optical member for focusing light from said light source upon said film at a second location, when said second screen size mode is selected, whereby an image is imprinted upon said film at said second location;
 bracket means for coupling said first and second optical members in a fixed relationship to each other; and
 said bracket means being mounted in said body of said camera such that said first and second optical members focus said light source upon said film.

5. A data imprinting device for a camera according to claim 4 wherein said first and second optical members and said bracket means are integrally formed.

6. A data imprinting device for a camera according to claim 4 wherein said first and second screen size modes correspond to a full size screen size and a panorama screen size respectively.

7. A data imprinting device for a camera according to claim 4 comprising means for masking light coming from one of said first and second optical members corresponding to a screen size mode other than said chosen mode.

8. A data imprinting device for a camera according to claim 4, wherein said light source includes a plurality of light emitting diodes disposed in a line perpendicular to a surface of said film.

9. A data imprinting device for a camera as recited in claim 4, further comprising:
 said first and second optical members having emergent planes equidistant from said film;
 said first and second optical members being disposed substantially in a common plane perpendicular to said film in a width-wise direction of said film; and
 said second optical member having an incident optical axis set further from said film than an incident optical axis of said first optical member.

10. A data imprinting device for a camera as recited in claim 4, further comprising:
 said first and second optical members having emergent planes equidistant from said film;
 said first and second optical members being offset from each other in a direction of movement of said film; and
 said first and second optical member having an incident optical axes disposed substantially in a common plane parallel to said film.

11. A data imprinting device for a camera comprising:
 means for selecting a chosen mode of a first and a second screen size mode;
 a light source mounted in a body of said camera;
 means for driving said light source responsive to a movement of a film;
 a first optical member for focusing light from said light source upon said film at a first location, when said first screen size mode is selected, whereby an image is imprinted upon said film at said first location;
 a second optical member for focusing light from said light source upon said film at a second location, when said second screen size mode is selected, whereby an image is imprinted upon said film at said second location; and
 said of optical members having equivalent numerical apertures at incident sides thereof.

12. A data imprinting device for a camera as recited in claim 11, further comprising:
   said first and second optical members having emergent planes equidistant from said film;
   said first and second optical members being disposed substantially in a common plane perpendicular to said film in a width-wise direction of said film; and
   said second optical member having an incident optical axis set further from said film than an incident optical axis of said first optical member.

13. A data imprinting device for a camera as recited in claim 11, further comprising:
   said first and second optical members having emergent planes equidistant from said film;
   said first and second optical members being offset from each other in a direction of movement of said film; and
   said first and second optical member having an incident optical axes disposed substantially in a common plane parallel to said film.

14. A data imprinting device for a camera as recited in claim 11, further comprising said first and second optical members having equal angles of inclination of incident light.

15. A data imprinting device for a camera, comprising:
   means for selecting a chosen mode of a first and a second screen size mode;
   a light source mounted in a body of said camera;
   means for driving said light source responsive to a movement of a film;
   a first optical member for focusing light from said light source upon said film at a first location, when said first screen size mode is selected, whereby an image is imprinted upon said film at said first location;
   a second optical member for focusing light from said light source upon said film at a second location, when said second screen size mode is selected, whereby an image is imprinted upon said film at said second location; and
   said first and second optical members each having a pre-adjusted transmittance such that images created by each have substantially identical exposure characteristics.

16. A data imprinting device for a camera as recited in claim 15, further comprising:
   said first and second optical members having emergent planes equidistant from said film;
   said first and second optical members being disposed substantially in a common plane perpendicular to said film in a width wise direction of said film; and
   said second optical member having an incident optical axis set further from said film than an incident optical axis of said first optical member.

17. A data imprinting device for a camera as recited in claim 15, further comprising:
   said first and second optical members having emergent planes equidistant from said film;
   said first and second optical members being offset from each other in a direction of movement of said film; and
   said first and second optical member having an incident optical axes disposed substantially in a common plane parallel to said film.

18. A data imprinting device for a camera, comprising:
   means for selecting a chosen mode of a first and a second screen size mode;
   a light source mounted in a body of said camera;
   means for driving said light source responsive to a movement of a film;
   a first optical member for focusing light from said light source upon said film at a first location, when said first screen size mode is selected, whereby an image is imprinted upon said film at said first location;
   a second optical member for focusing light from said light source upon said film at a second location, when said second screen size mode is selected, whereby an image is imprinted upon said film at said second location; and
   said first and second optical members having numerical apertures, $NA_K$ and $NA_{K+1}$ respectively, and transmittances, $T_K$ and $T_{K+1}$ respectively, satisfying the expression, $$(NA_K)^2 \cdot T_K = (NA_{K+1})^{2*} T_{K+1}.$$

19. A data imprinting device for a camera as recited in claim 18, further comprising:
   said first and second optical members having emergent planes equidistant from said film;
   said first and second optical members being disposed substantially in a common plane perpendicular to said film in a width-wise direction of said film; and
   said second optical member having an incident optical axis set further from said film than an incident optical axis of said first optical member.

20. A data imprinting device for a camera as recited in claim 19, further comprising:
   said first and second optical members having emergent planes equidistant from said film;
   said first and second optical members being offset from each other in a direction of movement of said film; and
   said first and second optical member having an incident optical axes disposed substantially in a common plane parallel to said film.

* * * * *